(12) United States Patent
Danilov et al.

(10) Patent No.: US 11,740,828 B2
(45) Date of Patent: Aug. 29, 2023

(54) DATA EXPIRATION FOR STREAM STORAGES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 85 days.

(21) Appl. No.: 17/223,263

(22) Filed: Apr. 6, 2021

(65) Prior Publication Data
US 2022/0317915 A1    Oct. 6, 2022

(51) Int. Cl.
*G06F 3/06* (2006.01)

(52) U.S. Cl.
CPC .......... *G06F 3/0652* (2013.01); *G06F 3/0608* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 3,617,587 A | 11/1971 | Nayar et al. | |
| 5,826,977 A | 10/1998 | Fowler et al. | |
| 7,340,690 B2 | 3/2008 | Lau | |
| 7,430,570 B1 | 9/2008 | Srinivasan et al. | |
| 7,610,437 B2 * | 10/2009 | Sinclair | G06F 3/0652 |
| | | | 711/104 |
| 7,769,717 B2 | 8/2010 | Federwisch et al. | |
| 7,984,084 B2 * | 7/2011 | Sinclair | G06F 16/1847 |
| | | | 707/818 |

(Continued)

FOREIGN PATENT DOCUMENTS

| CA | 2 534 170 A1 | 7/2007 |
|---|---|---|
| CA | 2672879 | 4/2008 |

(Continued)

OTHER PUBLICATIONS

Notice of Allowance dated Apr. 11, 2022 for U.S. Appl. No. 16/944,089, 87 pages.

(Continued)

*Primary Examiner* — Christopher D Birkhimer
(74) *Attorney, Agent, or Firm* — Amin, Turocy & Watson, LLP

(57) ABSTRACT

The described technology is generally directed towards fine-grained data event expiration in a streaming data storage system. An event to append is given an expiration period, and the expiration time for the events in a data stream or segment of a data stream is the largest expiration time among events in the data stream or segment. Different segments can have different expiration times for their events. In a segment comprising a group of events, a subgroup of expired events prior to a stream cut are deleted by an expiration task. For a subgroup of unexpired events prior to a stream cut, the expiration task retains (does not delete) the subgroup of events. If a scaling operation is performed on a segment, the new successor segment or segments inherit the largest expiration time of the predecessor segment or segments.

20 Claims, 13 Drawing Sheets

(56) References Cited

U.S. PATENT DOCUMENTS

| | | | |
|---|---|---|---|
| 8,285,918 B2* | 10/2012 | Maheshwari | G11C 7/1072 711/159 |
| 8,443,263 B2* | 5/2013 | Selinger | G06F 11/1068 714/768 |
| 8,572,091 B1 | 10/2013 | Sivasubramanian et al. | |
| 8,655,825 B2 | 2/2014 | Roesch et al. | |
| 8,732,403 B1* | 5/2014 | Nayak | G06F 3/0619 711/170 |
| 8,825,848 B1 | 9/2014 | Dotan et al. | |
| 8,873,284 B2* | 10/2014 | Sinclair | G06F 12/0246 365/185.11 |
| 8,984,248 B2 | 3/2015 | Morishita et al. | |
| 9,223,693 B2* | 12/2015 | Sinclair | G06F 12/0246 |
| 9,336,133 B2* | 5/2016 | Sinclair | G06F 12/0246 |
| 9,348,746 B2* | 5/2016 | Sinclair | G06F 12/0246 |
| 9,407,521 B1 | 8/2016 | Kulkarni | |
| 9,465,731 B2* | 10/2016 | Sinclair | G06F 12/0246 |
| 9,514,018 B2 | 12/2016 | Sikri | |
| 9,591,316 B2 | 3/2017 | Bracha et al. | |
| 9,639,589 B1 | 5/2017 | Theimer et al. | |
| 9,715,434 B1* | 7/2017 | Xu | G06F 3/067 |
| 9,734,050 B2* | 8/2017 | Sinclair | G06F 12/0253 |
| 9,734,911 B2* | 8/2017 | Sinclair | G06F 3/0658 |
| 9,753,932 B1 | 9/2017 | Brow et al. | |
| 9,778,855 B2* | 10/2017 | Sinclair | G06F 3/064 |
| 9,892,803 B2* | 2/2018 | Reed | G06F 12/0811 |
| 9,898,482 B1 | 2/2018 | Bono | |
| 9,965,215 B1 | 5/2018 | Vazhenin et al. | |
| 10,108,543 B1* | 10/2018 | Duggal | G06F 3/0619 |
| 10,108,544 B1* | 10/2018 | Duggal | G06F 16/1748 |
| 10,120,613 B2* | 11/2018 | Sinclair | G06F 12/02 |
| 10,133,490 B2* | 11/2018 | Sinclair | G06F 3/0655 |
| 10,255,179 B2* | 4/2019 | Ji | G06F 3/0659 |
| 10,338,834 B1 | 7/2019 | Dighe et al. | |
| 10,430,279 B1* | 10/2019 | Dittia | G06F 3/0656 |
| 10,565,208 B2 | 2/2020 | Triou, Jr. et al. | |
| 10,628,424 B2 | 4/2020 | Park et al. | |
| 10,705,741 B1 | 7/2020 | Varadarajan et al. | |
| 10,795,812 B1* | 10/2020 | Duggal | G06F 3/067 |
| 10,860,457 B1 | 12/2020 | Evenson et al. | |
| 10,867,033 B2 | 12/2020 | Keren et al. | |
| 10,891,228 B2* | 1/2021 | Steinmacher-Burow | G06F 12/0817 |
| 10,983,715 B2* | 4/2021 | Sharoni | G06Q 20/105 |
| 11,016,826 B2 | 5/2021 | Lehmann | |
| 11,086,537 B2* | 8/2021 | Byun | G06F 3/0679 |
| 11,194,638 B1 | 12/2021 | Danilov et al. | |
| 11,314,779 B1 | 4/2022 | Jain | |
| 11,354,054 B2 | 6/2022 | Danilov et al. | |
| 2004/0199524 A1 | 10/2004 | Rys et al. | |
| 2005/0025152 A1 | 2/2005 | Georgiou et al. | |
| 2005/0055519 A1 | 3/2005 | Stuart et al. | |
| 2006/0036568 A1 | 2/2006 | Moore et al. | |
| 2006/0058987 A1 | 3/2006 | Kumar et al. | |
| 2007/0033325 A1* | 2/2007 | Sinclair | G06F 3/0608 711/170 |
| 2007/0047635 A1 | 3/2007 | Stojanovic et al. | |
| 2007/0220518 A1 | 9/2007 | Verbowski et al. | |
| 2008/0059724 A1 | 3/2008 | Stifter, Jr. | |
| 2008/0082596 A1* | 4/2008 | Gorobets | G06F 12/0253 |
| 2008/0144079 A1* | 6/2008 | Pandey | H03M 7/30 358/1.15 |
| 2008/0184262 A1 | 7/2008 | Ginis et al. | |
| 2008/0189477 A1* | 8/2008 | Asano | G06F 12/0246 711/E12.008 |
| 2008/0288713 A1 | 11/2008 | Lee et al. | |
| 2008/0301135 A1 | 12/2008 | Alves et al. | |
| 2009/0182784 A1 | 7/2009 | Rohit et al. | |
| 2010/0077013 A1* | 3/2010 | Clements | G06F 16/1748 707/822 |
| 2010/0083098 A1 | 4/2010 | Leme et al. | |
| 2010/0088296 A1* | 4/2010 | Periyagaram | G06F 16/183 707/E17.014 |
| 2010/0125553 A1* | 5/2010 | Huang | G06F 11/1453 707/661 |
| 2010/0125794 A1 | 5/2010 | Hampton et al. | |
| 2010/0174881 A1* | 7/2010 | Anglin | G06F 11/1453 711/E12.103 |
| 2010/0205163 A1 | 8/2010 | Eshghi et al. | |
| 2010/0281081 A1* | 11/2010 | Stager | G06F 9/5022 707/814 |
| 2010/0333116 A1* | 12/2010 | Prahlad | G06F 16/1844 713/153 |
| 2011/0126099 A1 | 5/2011 | Anderson et al. | |
| 2011/0131588 A1 | 6/2011 | Allam et al. | |
| 2011/0145473 A1* | 6/2011 | Maheshwari | G06F 12/12 711/E12.008 |
| 2011/0161784 A1* | 6/2011 | Selinger | G06F 11/1016 714/E11.002 |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2012/0151014 A1 | 6/2012 | Gokhale et al. | |
| 2012/0198027 A1 | 8/2012 | Hetzler et al. | |
| 2012/0259994 A1 | 10/2012 | Gillies et al. | |
| 2013/0226931 A1 | 8/2013 | Hazel et al. | |
| 2013/0275808 A1 | 10/2013 | McNeeney et al. | |
| 2014/0006465 A1 | 1/2014 | Davis et al. | |
| 2014/0089264 A1 | 3/2014 | Talagala et al. | |
| 2014/0223115 A1 | 8/2014 | Dinkjian et al. | |
| 2014/0325148 A1* | 10/2014 | Choi | G06F 3/0659 711/114 |
| 2014/0365719 A1* | 12/2014 | Kuzmin | G06F 12/0246 711/103 |
| 2015/0169449 A1 | 6/2015 | Barrell et al. | |
| 2015/0172120 A1 | 6/2015 | Dwarampudi et al. | |
| 2015/0205816 A1* | 7/2015 | Periyagaram | G06F 11/1453 707/827 |
| 2015/0227602 A1* | 8/2015 | Ram | G06F 11/1456 707/634 |
| 2015/0261776 A1* | 9/2015 | Attarde | G06F 16/1748 707/664 |
| 2015/0341212 A1 | 11/2015 | Hsiao et al. | |
| 2015/0355862 A1 | 12/2015 | Hayes et al. | |
| 2015/0363245 A1 | 12/2015 | Mutschler | |
| 2016/0042008 A1 | 2/2016 | Tripathy et al. | |
| 2016/0063080 A1 | 3/2016 | Nano et al. | |
| 2016/0210061 A1 | 7/2016 | Soncodi et al. | |
| 2016/0246713 A1* | 8/2016 | Choi | G06F 3/0608 |
| 2016/0321287 A1 | 11/2016 | Luthra et al. | |
| 2016/0337435 A1 | 11/2016 | Nigam et al. | |
| 2016/0350324 A1* | 12/2016 | Wang | G06F 16/137 |
| 2016/0357476 A1 | 12/2016 | Chen et al. | |
| 2017/0038978 A1* | 2/2017 | Li | G06F 3/0611 |
| 2017/0075832 A1 | 3/2017 | Bhimani et al. | |
| 2017/0075947 A1 | 3/2017 | Kurilov et al. | |
| 2017/0123655 A1* | 5/2017 | Sinclair | G06F 3/061 |
| 2017/0177249 A1 | 6/2017 | Kurilov et al. | |
| 2017/0177263 A1 | 6/2017 | Das et al. | |
| 2017/0177546 A1 | 6/2017 | Heinz et al. | |
| 2017/0212891 A1 | 7/2017 | Pundir et al. | |
| 2017/0213127 A1 | 7/2017 | Duncan | |
| 2017/0255392 A1 | 9/2017 | Nakashima | |
| 2017/0289214 A1 | 10/2017 | Cho et al. | |
| 2018/0101842 A1 | 4/2018 | Ventura et al. | |
| 2018/0121307 A1 | 5/2018 | Braun et al. | |
| 2018/0146018 A1 | 5/2018 | Chang et al. | |
| 2018/0176244 A1 | 6/2018 | Gervais et al. | |
| 2018/0184138 A1 | 6/2018 | Shaw et al. | |
| 2018/0189175 A1* | 7/2018 | Ji | G06F 3/0679 |
| 2018/0314727 A1* | 11/2018 | Epstein | G06N 5/003 |
| 2018/0329644 A1 | 11/2018 | Das et al. | |
| 2018/0332325 A1 | 11/2018 | Kaitchuck | |
| 2018/0332365 A1 | 11/2018 | Kaitchuck et al. | |
| 2018/0332366 A1 | 11/2018 | Paduroiu | |
| 2018/0332367 A1 | 11/2018 | Kaitchuck et al. | |
| 2018/0336256 A1 | 11/2018 | Li et al. | |
| 2018/0345140 A1 | 12/2018 | Posin | |
| 2019/0004863 A1 | 1/2019 | Mainali et al. | |
| 2019/0026301 A1 | 1/2019 | Wang et al. | |
| 2019/0057138 A1 | 2/2019 | Knowles et al. | |

(56) References Cited

U.S. PATENT DOCUMENTS

| | | | |
|---|---|---|---|
| 2019/0129806 | A1 | 5/2019 | Hsu et al. |
| 2019/0138494 | A1 | 5/2019 | Inoue |
| 2019/0197173 | A1 | 6/2019 | Tahara et al. |
| 2019/0278849 | A1 | 9/2019 | Chandramouli et al. |
| 2019/0327297 | A1 | 10/2019 | Madani |
| 2019/0332318 | A1 | 10/2019 | Gooding et al. |
| 2019/0340180 | A1 | 11/2019 | Barsness et al. |
| 2019/0349422 | A1 | 11/2019 | Dhruvakumar et al. |
| 2020/0034468 | A1 | 1/2020 | Lei et al. |
| 2020/0089420 | A1* | 3/2020 | Sharoni ............... G06Q 20/354 |
| 2020/0174695 | A1 | 6/2020 | Bazarsky et al. |
| 2020/0250172 | A1 | 8/2020 | Busjaeger et al. |
| 2020/0310686 | A1* | 10/2020 | Truong ................... G06F 3/067 |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0110328 | A1 | 4/2021 | Hsiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1* | 12/2021 | Santhakumar ...... G06F 11/3485 |
| 2022/0035533 | A1 | 2/2022 | Danilov et al. |
| 2022/0182724 | A1 | 6/2022 | Gupta et al. |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Yean 2020).

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Office Action dated Apr. 20, 2022 for U.S. Appl. No. 16/944,094, 48 pages.

Office Action dated Apr. 12, 2022 for U.S. Appl. No. 17/038,102, 48 pages.

Notice of Allowance dated Apr. 27, 2022 for U.S. Appl. No. 17/127,724, 19 pages.

Office Action dated May 24, 2022 for U.S. Appl. No. 17/237,535, 62 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https//flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html] The Apache Software Foundation. Copyright 2014-2019, retrieved Aug. 26, 2020, 8 pages.

"What is Apache Flink?—Operations" [https://flink.apache.org/flink-operations.html] The Apache Software Foundation. Copyright 2014-2019, retrieved Aug. 26, 2020, 3 pages.

"Use Cases" [https://flink apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Aug. 4, 2021 for U.S. Appl. No. 17/200,652, 51 pages.

Office Action dated Oct. 1, 2021 for U.S. Appl. No. 17/127,724, 41 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 16/915,762, 57 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

(56) References Cited

OTHER PUBLICATIONS

Azhar et al., "Efficient selection of access control systems through multi criteria analytical hierarchy process", IEEE, doi: 10.1109/ICET.2012.6375419, 2012, pp. 1-8. (Year: 2012).

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).

Notice of Allowance dated Feb. 18, 2022 for U.S. Appl. No. 17/083,145, 70 pgs.

Office Action dated Mar. 21, 2022 for U.S. Appl. No. 16/864,905, 125 pgs.

Muskardin et al., "Implementation of Hashing Algorithms in Stream Mining", International Conference on Smart Systems and Technologies (SST), Oct. 2018 , pp. 233-238.

Office Action dated Jul. 8, 2022 for U.S. Appl. No. 16/864,892, 33 pages.

Office Action dated Jul. 15, 2022 for U.S. Appl. No. 16/864,905, 77 pages.

Office Action dated Sep. 1, 2022 for U.S. Appl. No. 16/944,094, 25 pages.

Office Action dated Jul. 21, 2022 for U.S. Appl. No. 17/070,029, 68 pages.

Notice of Allowance dated Aug. 24, 2022 for U.S. Appl. No. 17/152,544, 55 pages.

Office Action dated Sep. 15, 2022 for U.S. Appl. No. 17/383,425, 61 pages.

Phaujdar, "Understanding Event Streams—A Comprehensive Guide 101_ Learn Hevo" [https://hevodata.com/learn/understanding-event-streams/] (Feb. 17, 2021) (Year: 2021).

Dhanushka, "Understanding Kafka Topic Partitions" [https://medium.com/event-driven-utopia/understanding-kafka-topic-partitions-ae40f80552e8]—(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).

Office Action dated Sep. 30, 2022 for U.S. Appl. No. 17/408,344, 66 pages.

Notice of Allowance dated Nov. 15, 2022 for U.S. Appl. No. 16/864,892, 48 pages.

Notice of Allowance dated Nov. 23, 2022 for U.S. Appl. No. 17/408,344, 35 pages.

Notice of Allowance dated Nov. 17, 2022 for U.S. Appl. No. 16/944,094, 23 pages.

Notice of Allowance received for U.S. Appl. No. 17/063,906, dated Feb. 6, 2023, 29 pages.

Notice of Allowance received for U.S. Appl. No. 17/383,425, dated Feb. 1, 2023, 37 pages.

Office Action dated Feb. 10, 2023 for U.S. Appl. No. 17/145,588, 78 pages.

Non-Final Office Action received for U.S. Appl. No. 17/063,906, dated Oct. 27, 2022, 59 pages.

Notice of Allowance received for U.S. Appl. No. 16/864,905, dated Nov. 30, 2022, 347 pages.

Tony Tung et al., "Topology Dictionary for 3D Video Understanding", IEEE Transactions on Pattern Analysis and Machine Intelligence (vol. 34, Issue: 8, Aug. 2012), Dec. 2011, pp. 1645-1657.

A. Bulut et al., "Distributed data streams indexing using content-based routing paradigm", 19th IEEE International Parallel and Distributed Processing Symposium, Apr. 2005, pp. 1-10.

Notice of Allowance received for U.S. Appl. No. 17/070,029, dated Dec. 2, 2022, 36 pages.

Non-Final Office Action received for U.S. Appl. No. 17/152,558, dated Dec. 7, 2022, 59 pages.

Non-Final Office Action received for U.S. Appl. No. 17/337,940, dated Dec. 30, 2022, 68 pages.

Non Final Office Action received for U.S. Appl. No. 17/976,574 dated Mar. 2, 2023, 55 pages.

Notice of Allowance received for U.S. Appl. No. 17/337,940 dated Mar. 1, 2023, 70 pages.

Final Office Action dated May 12, 2023 for U.S. Appl. No. 17/152,558, 51 pages.

\* cited by examiner

DATA EXPIRATION FOR STREAM STORAGES

BACKGROUND

Contemporary data storage systems store data in a storage abstraction referred to as a stream. A stream is identified with a name, and can store continuous and potentially unbounded data; more particularly, a stream comprises a durable, elastic, append-only, sequence of stored events. New events are added to a tail (front) of a stream. One stream may be divided into one or more segments, with an event appended to a segment based on a routing key associated with the event that determines to which segment the event data is written.

Although a stream is potentially unbounded, storage resources are finite. Thus, events from a stream can be deleted from a head (back) of a stream. Not all stream data can simply be deleted, however, as data retention policies need to be followed for some types of data, typically for regulatory compliance or business reasons. Thus, only expired events can be deleted. However, in most scenarios it is not practical to maintain a separate expiration time for each event.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
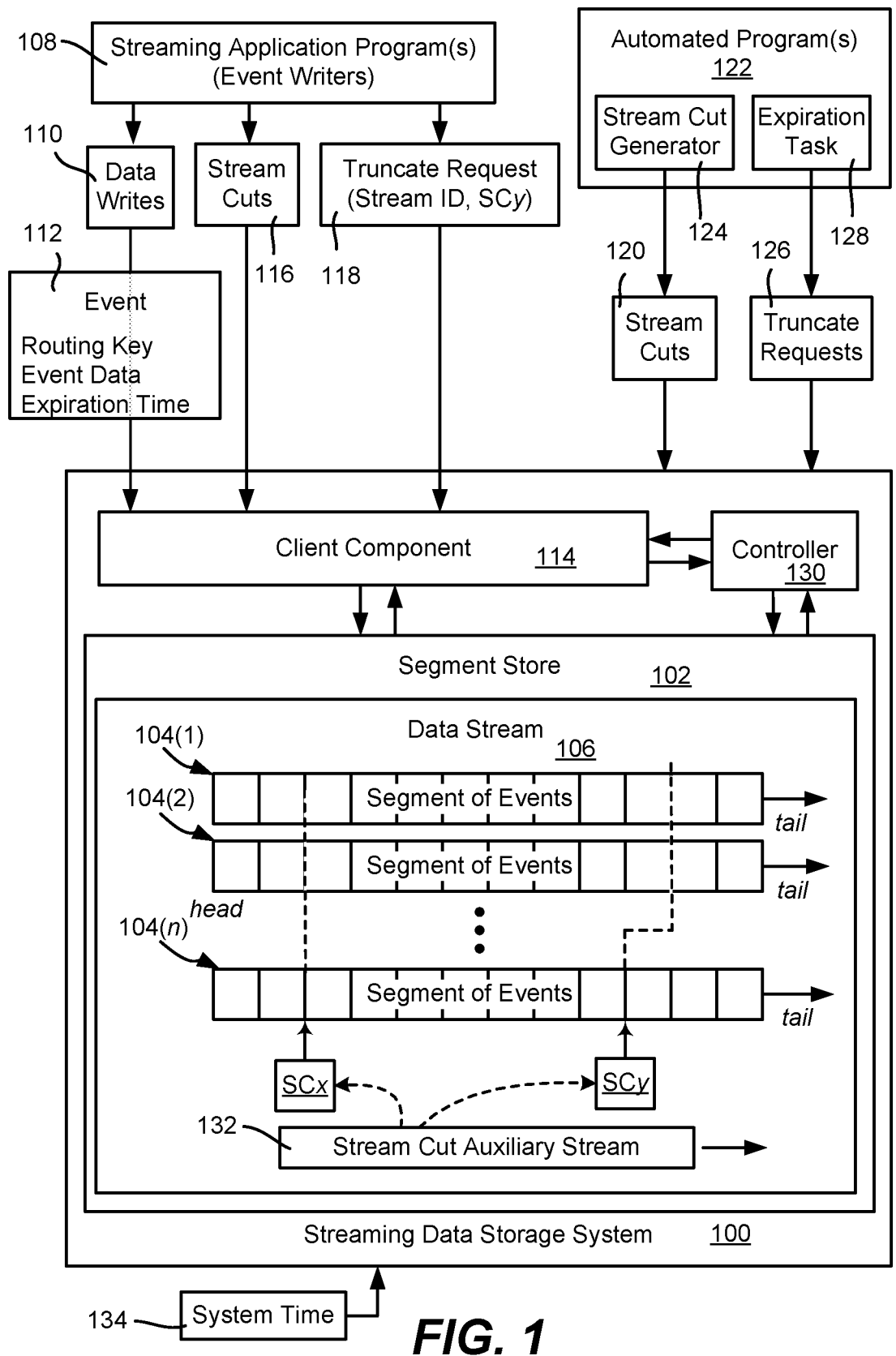
FIG. 1 is a block diagram representation of example components and data—related operations in a streaming data storage system that facilitates fine-grained data expiration of events, in accordance with various aspects and implementations of the subject disclosure.

Various aspects of the technology described herein are generally directed towards implementing time-based data expiration in streaming data storage systems, in which expiration policy can be specified at the event level. Via the technology, different events in one data stream can have different expiration periods relative to other events in the same data stream. Note that this is in contrast to a data expiration period specified at the stream level, in which the administrator/application program is forced to choose the longest expiration period any event in the stream may have and use that expiration period as the stream expiration period; this normally results in too conservative data expiration in which events with a short expiration period are retained for too long.

The technology described herein further facilitates fine-grained, event level expiration times on a per-segment basis. As will be understood, because it is not practical to maintain an expiration time with each event and evaluate each such time for individual event expiration, in each segment the event with the greatest expiration time determines the expiration time for that segment. A segment's events can be automatically expired based on the given segment's expiration time.

It should be understood that any of the examples herein are non-limiting. For instance, virtually any stream-based data storage system may benefit from the technology described herein. As a more particular example, instead of tracking time for each event, a "stream cut object" or simply a "stream cut" refers to a specific position in the segment of a data stream on an event boundary; expired data is deleted from a stream cut boundary (rather than arbitrarily). A stream cut is associated with a time value, referred to as a stream cut expiration time. Other data stream storage systems can use a similar concept, or can use timestamped data; notwithstanding, as will be understood, the technology described herein can be applied to any stream-based data storage mechanism. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes a segment store 102 that maintains and manages segments 104(1)-104(n) of at least part of a data stream 106. Note that the segments 104(1)-104(n) can be distributed among segment store instances, such as distributed among different nodes of a node cluster.

In general, an event writer such as a streaming application program 108 sends data writes 110 comprising an event 112 into the streaming data storage system 100 via an application programming interface (API) of a client component 114 in one implementation. As described herein, an event 112 comprises a routing key, the event data (payload) and an expiration time for that event 112. The application program 108 also can send stream cuts 116 and truncate requests 118 to the streaming storage system 100, such as by identifying the stream for which truncation is requested, and specifying a particular stream cut.

More particularly, as set forth herein, a position in a stream at an event boundary is specified using a stream cut. The application program 104 can request association of a stream cut with a stream, as represented by block 116. However, in the examples described herein, the system rather than the application program 108 causes generation of the stream cuts and automatically expires data. Thus, instead of (or in addition to) application-specified stream cuts, other stream cuts 120 can be generated automatically, such as periodically, by automated program(s) 122 or the like, e.g., a stream cut generator 124. The automated program(s) can also send truncate requests 126, such as when the stream reaches a size capacity limit and/or periodically, e.g., by an expiration task 128, which in one implementation runs as a background task. As described herein, the automated programs (e.g., the stream cut generator 124 and/or the expiration task 128 can be operated by or incorporated into a controller 130, that is, the controller 130 can generate stream cuts and run the expiration task 128, such as periodically based on administrator-specified configuration policy data, which can include granularity (how often to generate a next stream cut). It is also feasible for the segment store 102 to perform automated truncation on its segments.

As described herein, the stream cuts for a stream can be considered a series of stream cuts. In one or more implementations, the stream cuts may be maintained as an auxiliary system stream 132 associated with the segments 104(1)-104(n) of the data stream 106.

As set forth above, deletion of individual events based on their individual expiration times is impractical for most streaming data storage use-cases. Stream truncation using stream cuts is practical, whereby the technology described herein uses bulk-mode data deletion by means of stream truncation (or discarding stream head events, or decapitation) of a subgroup of expired events prior to a stream cut.

To this end, information related to data expiration is associated with stream cuts, that is, there is an expiration time associated with each stream cut. When an expiration task reaches another stream cut, the expiration task compares the stream cut's expiration time to the current system time 134; (note that the correct system time 134 can be obtained via use of the Network Time Protocol (NTP)). If the expiration time is in the future, the expiration task leaves the stream alone until next evaluation time. Otherwise the expiration truncates the stream using the stream cut, that is, deletes the subgroup of expired events that are prior to the stream cut.

For further granularity, a time-based expiration value (e.g., based on the system time 134) can be associated with each stream cut and each segment, that is, the stream cut expiration time can be maintained on a per-segment basis, which as described herein depends on the events' expiration times in each segment. Thus, as described herein, each segment can have an associated expiration time, namely the maximum expiration time of any event prior to the stream cut in one implementation. When a stream is requested to be truncated, e.g., periodically and/or based on size, the expiration task 128 (or other system component) evaluates the specified stream cut, and for each segment, whether the segment's expiration time is in the future. If not in the future, the segment's events prior to the stream cut are deleted.

To determine an expiration time for a stream cut, respective expiration periods can be associated with respective individual events. There is no need to store per-event expiration periods to streams/segments, as an event's expiration period can be used at the event creation moment and discarded thereafter.

Figure 2A:
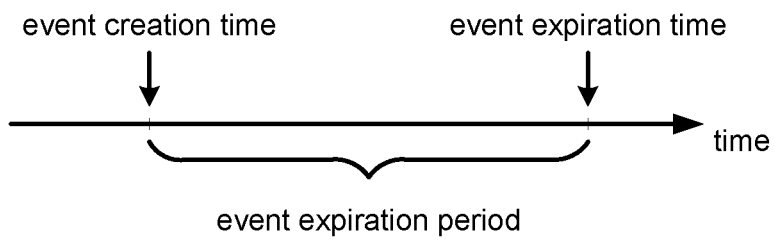
FIG. 2A is an example representation of how an event with an expiration period has an event expiration time determined for the event, in accordance with various aspects and implementations of the subject disclosure.

As represented in FIG. 2A, when new event is created within a stream, the time the event is created is called the event creation time. An expiration policy can be specified for the event, which basically defines the expiration period for the event. The period starts at the moment the event is created, and the moment the period ends is called the event expiration time. The application does not need the event after its expiration time, so the system is expected to delete the event shortly thereafter to release the storage capacity it occupies.

More particularly, an expiration time can be calculated for an individual event at the moment of event creation using the following, for any event [i]:

$$\text{event}[i].\text{expiration\_time} = \text{event}[i].\text{creation\_time} + \text{event}[i].\text{expiration\_period}$$

Then, as a stream cut has to protect the events that are ahead of the stream cut from a premature automatic deletion, the stream cut "inherits" the expiration times of a group of events. That is, as represented in FIG. 2B, for a stream cut[j]:

$$\text{stream\_cut}[j].\text{expiration\_time} = \max(\text{event}[i].\text{expiration\_time})$$

where the event[i]'s represent the group of events that were created before the j'th stream cut. Note that because of the max( ) function, the expiration time for a stream/segment looks like an "expiration front" that can move forward but cannot move backward.

Figure 2B:
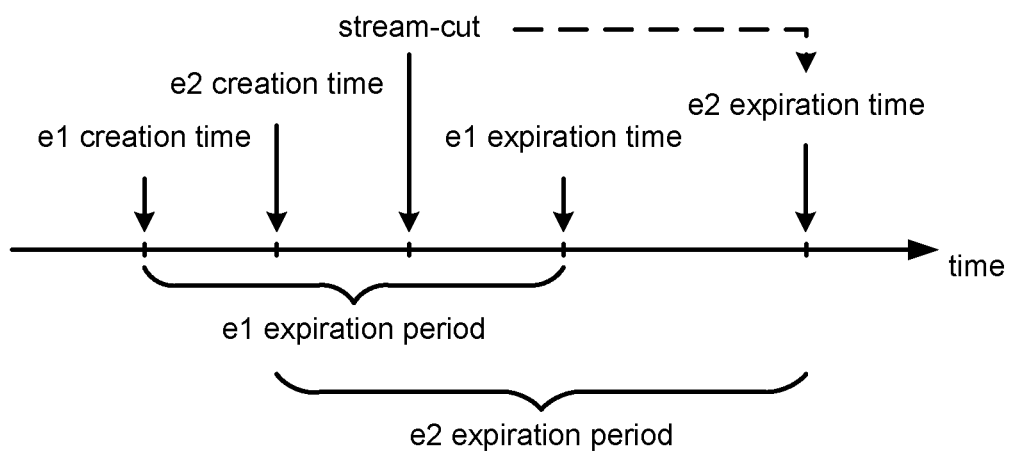
FIG. 2B is an example representation of how events with different creation times and expiration periods are used to obtain the largest event expiration time, in accordance with various aspects and implementations of the subject disclosure.

As can be seen in FIG. 2B, where a stream segment contains two events e1 and e2 with different creation times and different expiration periods, the expiration times of the events are also different. The stream cut, which was created after the two events, inherits the greater (the maximum/rightmost) expiration time, which is event e2's expiration time in this example. The stream can be auto-truncated by the expiration task using the stream cut only when the current system time is greater or equal to the stream cut's expiration time.

Figure 3:
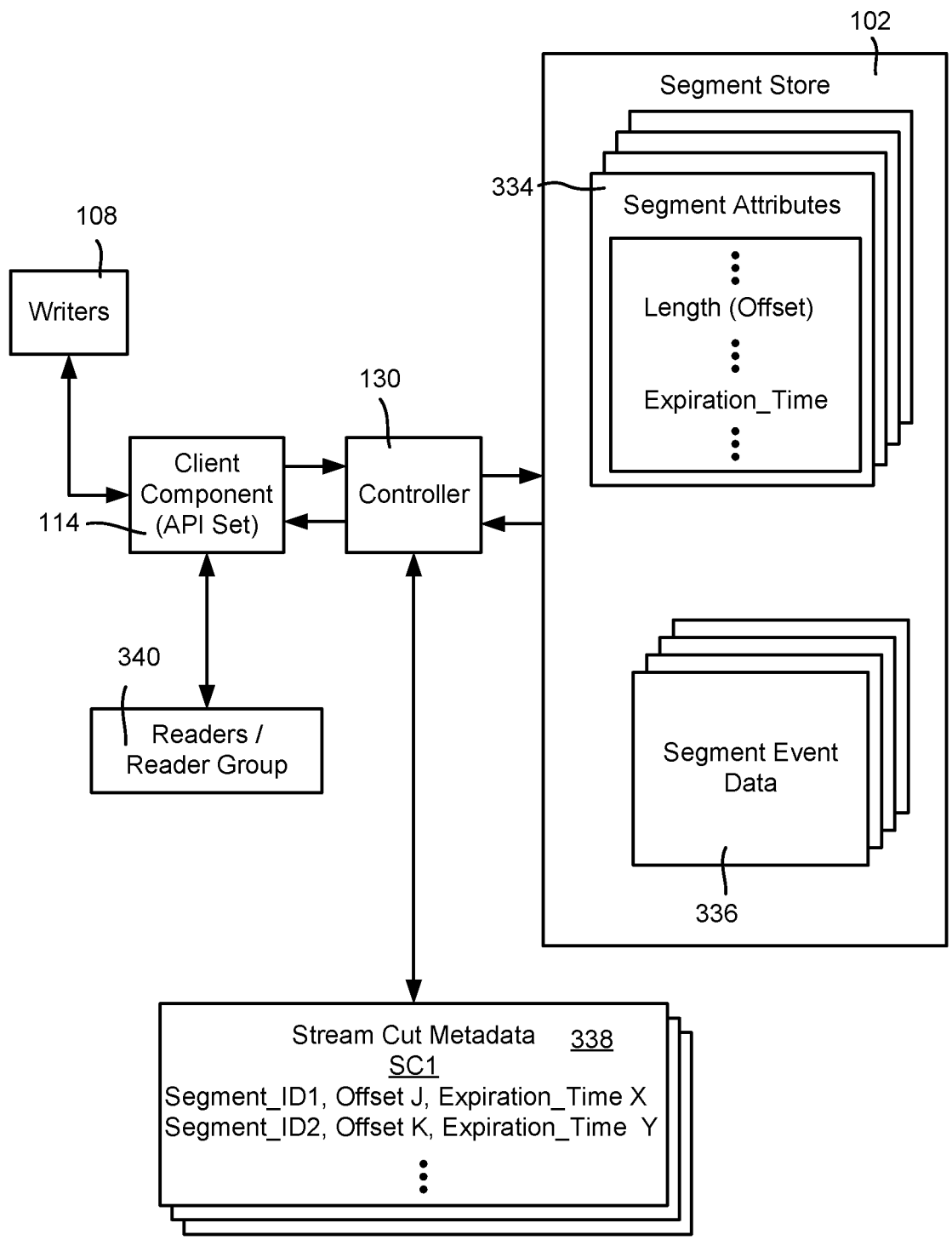
FIG. 3 is a representation of example components and data structures that facilitate event-level data expiration, in accordance with various aspects and implementations of the subject disclosure.

In one implementation, the segment store (the instance that manages a stream segment) calculates an expiration time for every new event, maintaining only the maximum expiration time for those the events within the segment. As shown in FIG. 3, the maximum expiration time for a segment can be persisted with other segment metadata (attributes) 334. When another stream cut is created, the stream cut gets the current segment's maximum expiration time as the stream cut's effective expiration time. For additional detail, FIG. 3 shows the segment event data 336 and stream cut's metadata 338 (described below), along with readers/reader groups 340 that read and process the events.

The segment store 102 is responsible for keeping track of the (longest) expiration time of the events in a segment. As set forth herein, the system does not need to store the expiration period or expiration time for each event (which would waste resources). Instead, FIG. 4 shows an implementation of example operations as to how the segment store 102 may maintain the expiration time for stream segments (so that the controller 332 can use that information to maintain in a stream cut).

Figure 4:
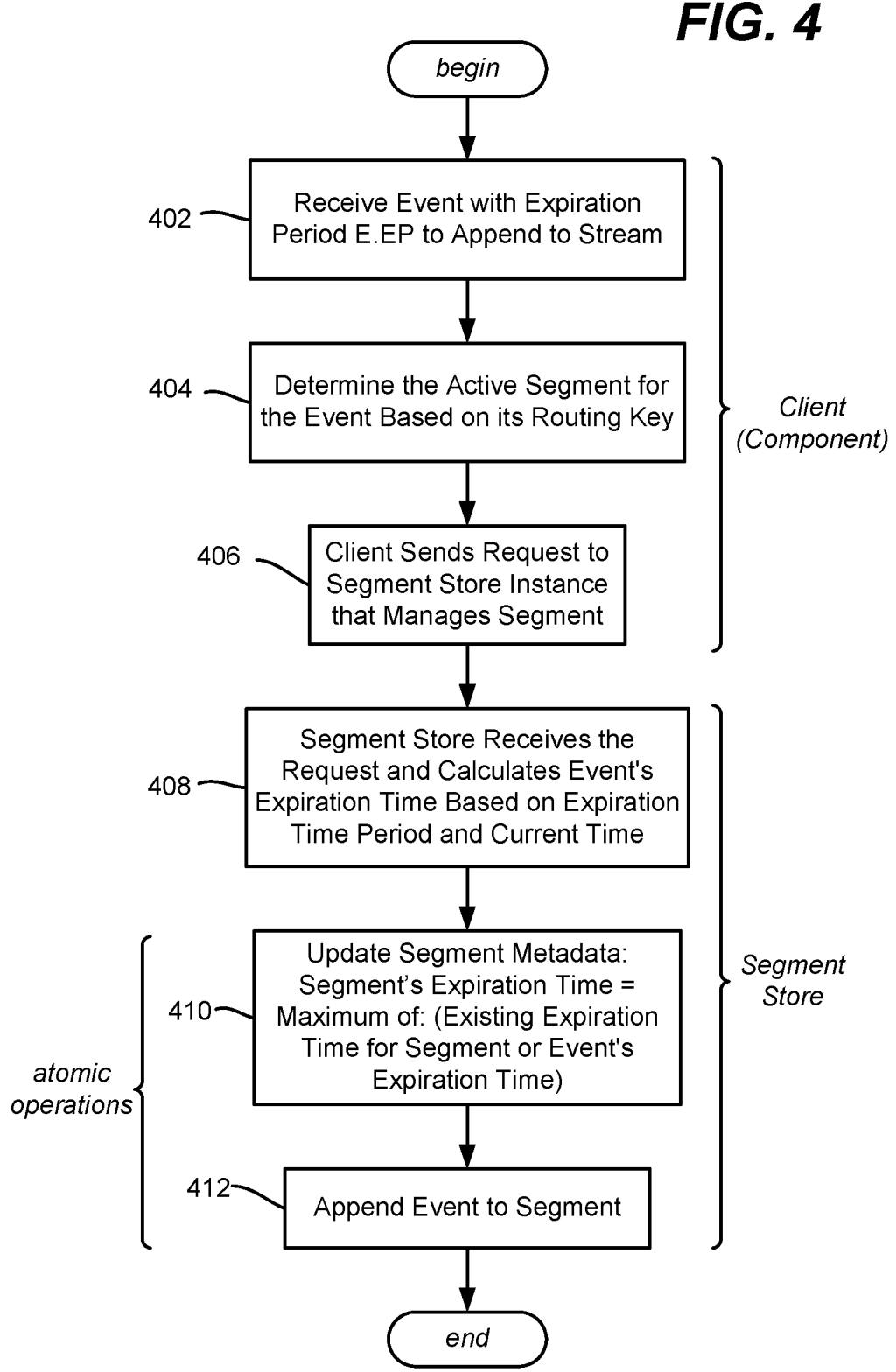
FIG. 4 is a flow diagram showing example operations related to handling an event that has an expiration time, in accordance with various aspects and implementations of the subject disclosure.

At operation 402 of FIG. 4, the client component 330 receives an event E with an expiration period E.EP to be appended to the stream S. At operation 404, the client 330 determines that the event E (based on its routing key has computation) is to be written to an active segment $S_k$. The client identifies the appropriate segment store instance (e.g., 102) that manages $S_k$, and sends the request to that segment store instance 102 at operation 406.

At operation 408, the segment store 102 receives the request to append E to $S_k$, with the current time being T. In one implementation, the event E's expiration time is therefore calculated as E.EXP:=T+E.EP; (although it is feasible for the event E's expiration time to be determined sooner). For the segment, the segment store 102 determines the segment $S_k$'s expiration time metadata to be $S_k$.EXP:=Max ($S_k$.EXP, E.ET), that is, the segment $S_k$'s expiration time is the longer of either the existing expiration time for that segment, or the new event's expiration time, as updated (if appropriate) via operation 410.

Operation 412 appends the event E to the segment $S_k$. It should be noted that, in conjunction with appending the event E to the segment $S_k$, the segment store atomically updates $S_k$'s metadata to ensure that $S_k$'s expiration time is set as described in operation 410 as described above. The atomicity of operations 410 and 412 prevent a situation in which the segment's expiration time is updated before or after the event is persisted, then a controller request (as described above) may get incorrect/inconsistent information about $S_k$'s length and expiration time, which could possibly lead to the premature deletion of events during an expiration operation.

Once these (atomic) operations 410 and 412 are done, when the controller 332 requests information as described herein (at operation 408 of FIG. 4), the segment store reads $S_k$'s length and expiration time ET from its metadata and returns in response to the controller's request.

Figure 5:
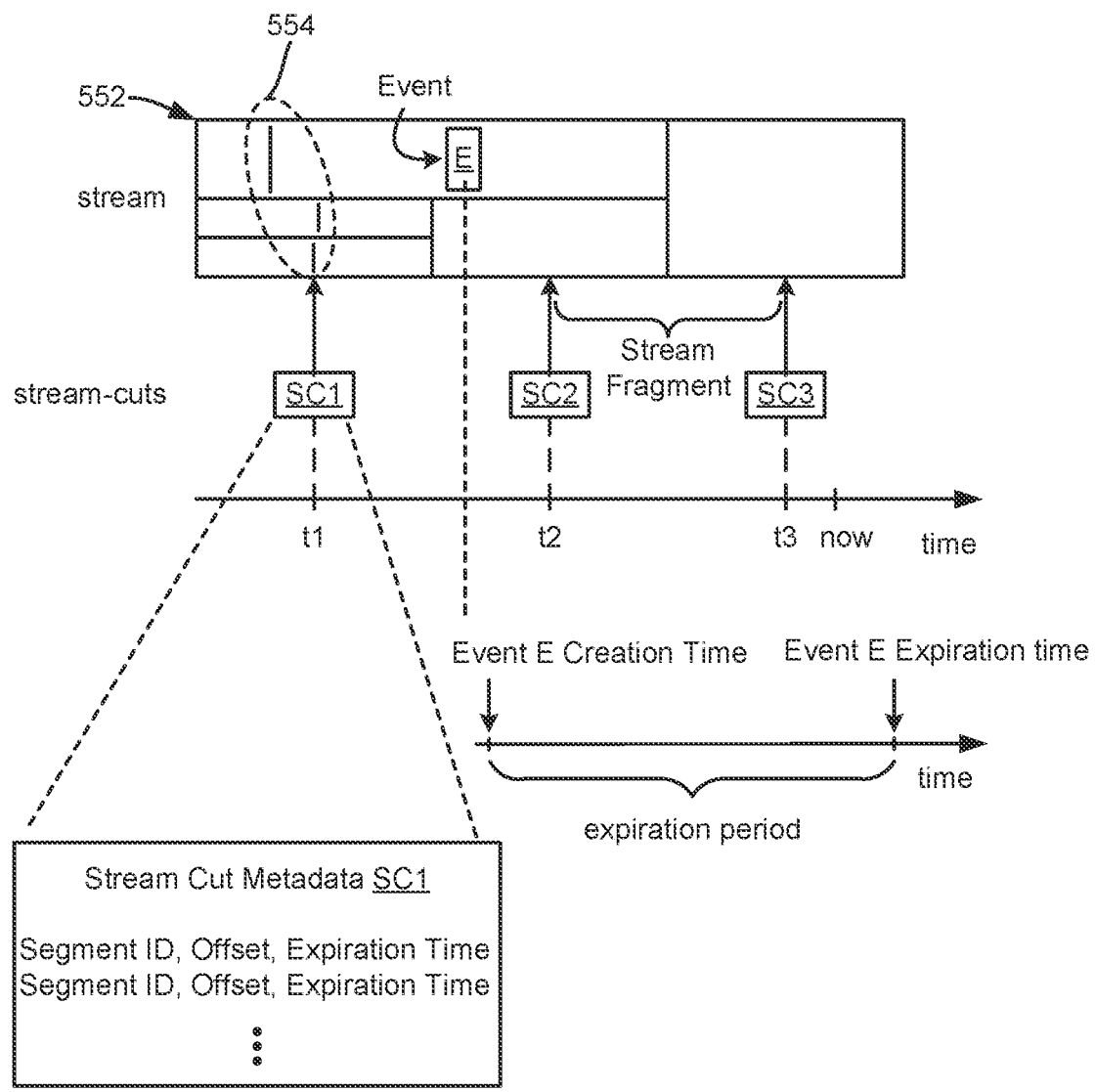
FIG. 5 is a block diagram representation of an example stream cut for multiple segments with different expiration times, in accordance with various aspects and implementations of the subject disclosure.

As shown in FIG. 5, stream cuts divide a stream 552 into a sequence of stream fragments, where a stream fragment is the part of a stream between two successive stream cuts. There is a generally a plurality of events stored within each stream fragment, and these events may reside in different stream segments. Each new stream cut "closes" another stream fragment; as highlighted in FIG. 5 by the dashed oval 554 containing lines representing event boundaries in segments (represented in FIG. 5 as rectangles making up the stream 552) corresponding to stream cut SC1. As shown via the event boundaries represented within the example dashed oval 554, because each stream cut divides a stream into two parts, each such stream cut needs to cross those segments that were active at the time the stream cut was generated. As such, a stream cut's metadata comprises a collection of key-value groupings (e.g., Key=Segment, Value=offset within segment), with one such grouping for each segment that the stream cut crosses. Note that events may have very different expiration periods, and events of different types may have very different intervals. Thus, it is possible that a stream cut has an expiration time that was calculated not for some event from the last stream fragment, but for an event from a quite distant stream fragment.

Thus, as described herein and represented in FIG. 3, a stream cut such as exemplified by the expanded stream cut SC1, the stream cut metadata 338 for each stream cut may include a set of groupings, e.g., segment name or identifier (ID) and offset within the segment (where the offsets are at an event boundaries in each active segment), along with the aforementioned stream cut expiration time (Key=segment, Value=offset within segment, Value=segment's expiration time), or as shown in the stream cut metadata 338 in FIG. 3 as, Segment_ID1, Offset J, Expiration_Time X, Segment_ID2, Offset K, Expiration_Time Y, and so on for each other segment; (note that the stream cut SC1 is for multiple segments in this example). Thus, a stream cut metadata 338 contains the offset locations (lengths) and expiration times of the various segments; a stream cut does not divide an event, but rather defines an event boundary for each segment.

Figure 6A:
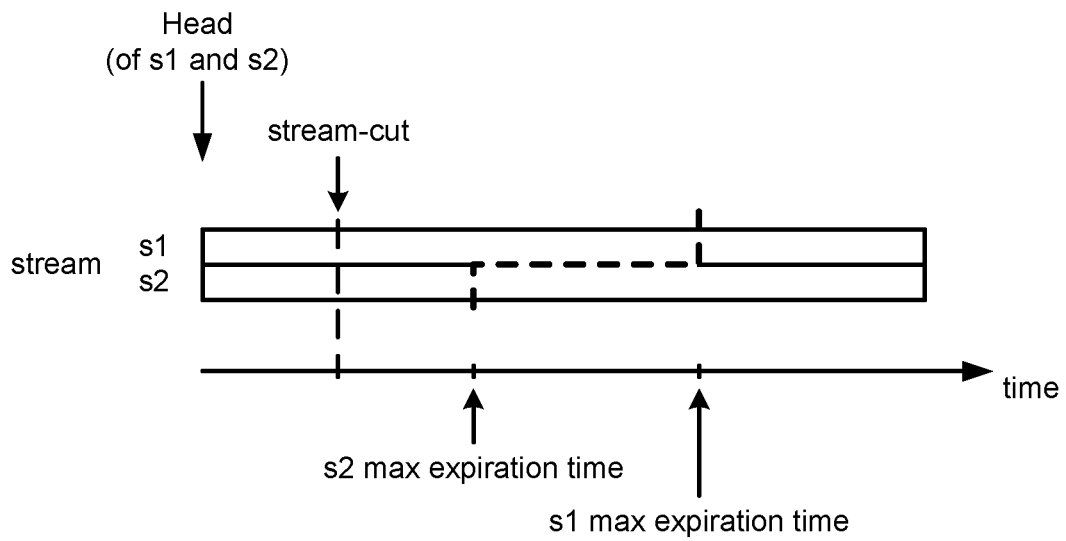
FIGS. 6A and 6B are example representations of how segments with different expiration times are handled with respect to deleting or retaining a subgroup of each segment's events prior to a stream cut, in accordance with various aspects and implementations of the subject disclosure.

Thus, when a stream is comprised of a set of segments, the system (the segment store 102) maintains respective maximum expiration times for respective individual segments of the stream. As a result, at the moment another stream cut is created, different segments of one data stream likely have different maximum expiration times, as represented in the two-segment data stream of FIG. 6A, that is, the two segments s1 and s2, have different maximum expiration times. While it is straightforward to calculate a maximal maximum expiration time among the stream segments and make that value the stream expiration time (for all segments of the stream), a more fine-grained approach is to use composite expiration times for stream-cuts. The thick dashed line in FIG. 6A depicts the composite expiration times associated with the stream-cut, which can be thought of as the segment_id, expiration_time parts of the stream cut's groupings.

Figure 6B:
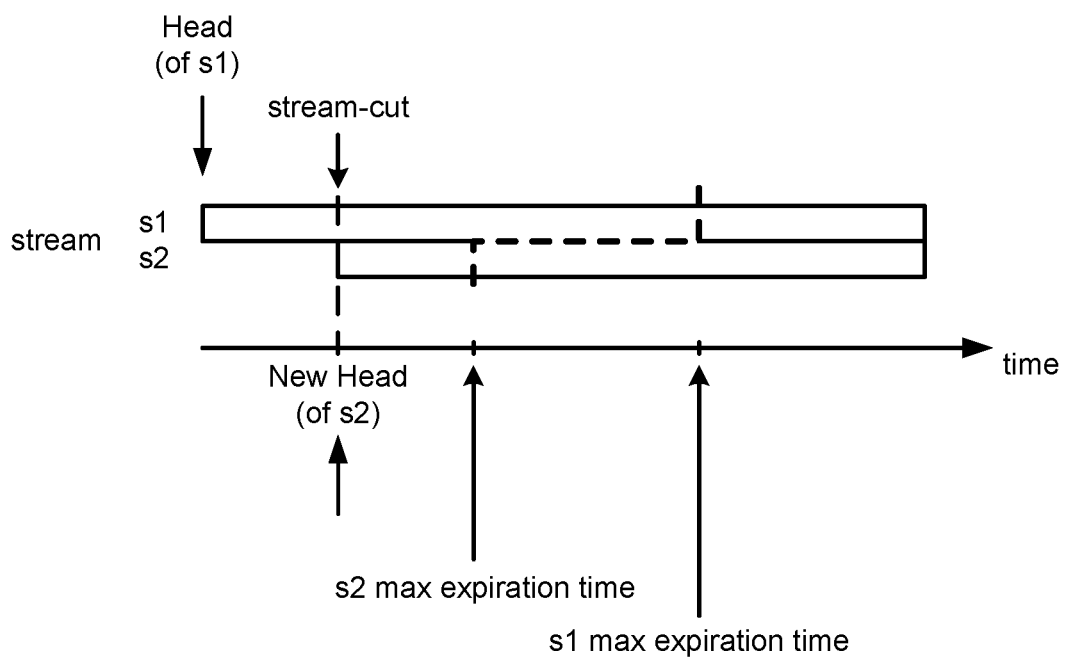

As shown in FIG. 6B, when expiration times can be composite, the expiration task may determine that only a part of stream data associated with a stream-cut has expired. When this occurs, the expiration task can delete only the expired data and leave unexpired data in the segment, at least until the next expiration check. The expiration task is finished with a stream cut when the expiration task has deleted the entire group of expired data events, for each segment, ahead of the stream cut. After that, the system (the controller) is free to delete the stream cut as the stream cut is no longer needed.

In FIG. 6B, the expiration task detects that the system (at time "now") is in the middle between the two expiration times associated with the stream cut. Therefore, the expiration task deletes the subgroup of event data of only one stream segment, s2, which is the stream segment with the expiration time in the past. The segment data that is deleted is the subgroup of events of segment s2 from the previous head up to the stream-cut, moving the "new" segment head of s2 forward.

Figure 7:
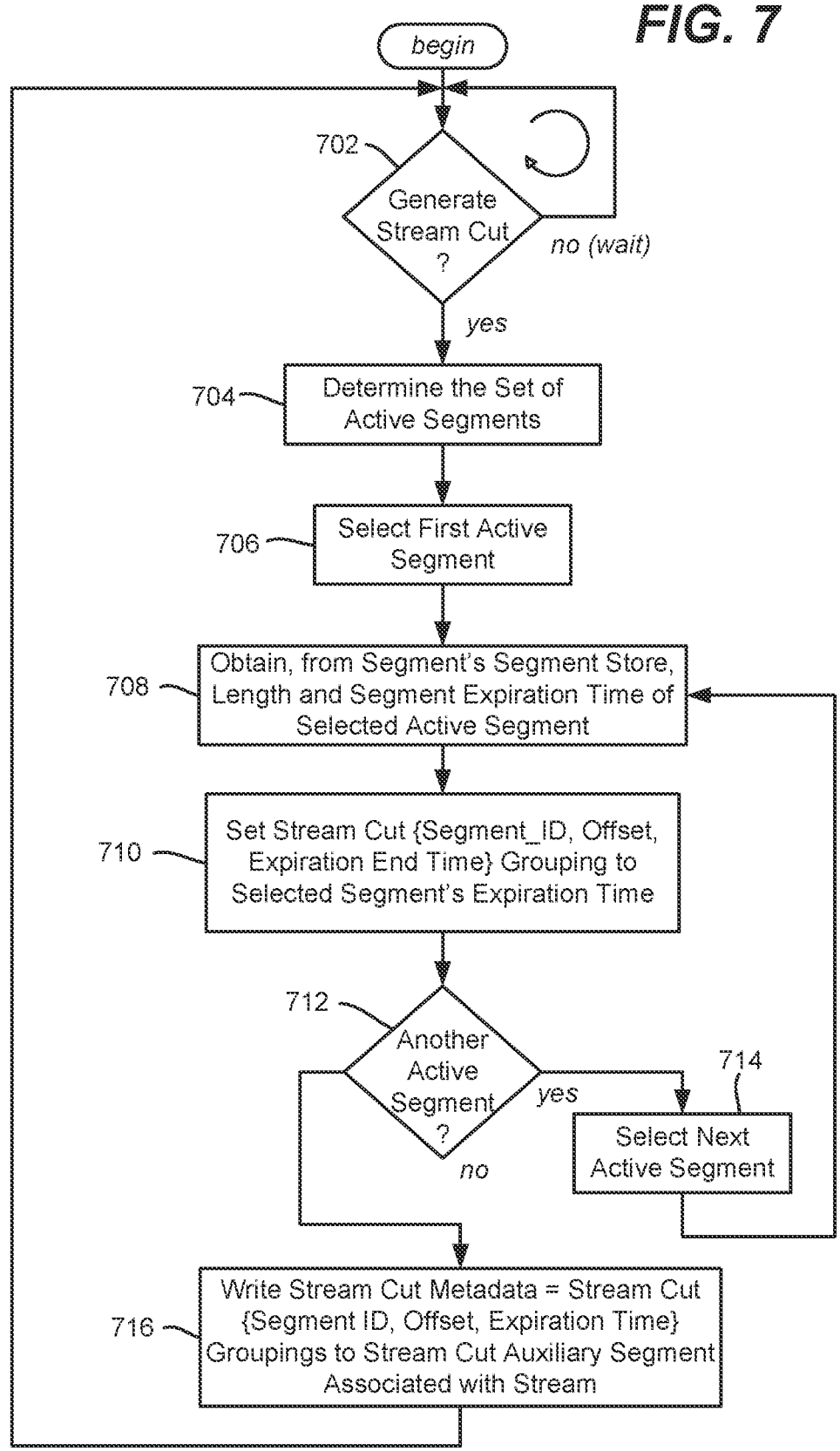
FIG. 7 is a flow diagram showing example operations related to generating a stream cut with per-segment expiration times, in accordance with various aspects and implementations of the subject disclosure.

FIG. 7 shows example operations for generating a stream cut, beginning at operation 702 where the controller 130 begins stream cut generation-related operations, e.g., periodically. As represented by operation 704 and by the components and data structures of FIG. 3, the controller 130 inspects the stream metadata to determine the set of active segments 342; (note that a segment that is scaled up or scaled down as described below is an inactive segment). The stream metadata that includes the active stream segments can be maintained in the segment store instance(s) and obtained by the controller therefrom, however it is understood that any suitable data structure accessible to the controller 130 can maintain a stream's active stream segment identifiers.

For each active segment $S_k$ in the active segment set of the stream S, (operations 706, 712 and 714), the controller 130 issues a request at operation 708 to the segment store 334 to obtain/retrieve the segment $S_k$'s length and the segment $S_k$'s expiration time, which are maintained as segment attributes 334 in the segment store 102 (as described herein and shown in FIG. 3).

More particularly, the various segments' metadata (attributes 334) may be stored in the segment store 102, although it is feasible to store some of it in other suitable location(s) in any number of ways. Note that in one or more implementations, a segment store such as 102 already maintain some segment metadata/attributes (e.g., relating to $S_k$'s length, truncation status, sealed status, how much of $S_k$ is in Tier 1 versus Tier 2 storage and so on, and thus for example, the segment store 102 may add to this this metadata to store the segment's expiration time as well, as shown in the segment attributes 334 in FIG. 3.

In one implementation, at operation 710 the controller 130 sets the grouping for the selected segment Sk to the obtained information of {Segment ID, Offset, Expiration Time} of segment Sk. This is repeated for each other active segment via operations 712 and 714. When the groupings are known, at operation 716, the controller 130 writes the stream cut SC's {Segment ID, Offset, Expiration Time} groupings into the stream cut's metadata associated with the stream cut associated with Stream S, (e.g., the stream cut auxiliary stream 132 for the data stream 106 in FIG. 1).

When a stream contains a relatively large number of segments, the graphical profile of the stream head (e.g., FIG. 6B) may be highly irregular. An administrator can use the fine-grained data expiration technology described herein to create more capacity-efficient systems, by generally having a group of events with similar expiration periods map to one segment, or a relatively small set of segments. This will operate to avoid having events with long lifetimes prevent the deletion of events with shorter lifetimes.

A stream is elastic in that segment(s) may be sealed and new segment(s) may replace them as successor segments(s) in a scaling event (a scale-up or scale-down event), such as automatically triggered (an auto-scaling operation) by the rate or size of event ingestion to a segment. Each scaling event creates a new epoch as described below.

In a scale-up event, an active segment is split into two or more newly created active segments referred to as successor segments; the segment that was split is referred to a predecessor segment, and is sealed in an atomic operation with the creation of the successor segments, whereby the predecessor segment is no longer an active segment. In a scale-down event, two or more active segments (the predecessor segments) are merged into a newly created active segment (the successor segment); the predecessor segments are sealed in an atomic operation with the creation of the successor segment, whereby the predecessor segments are no longer active segments.

Figure 8A:
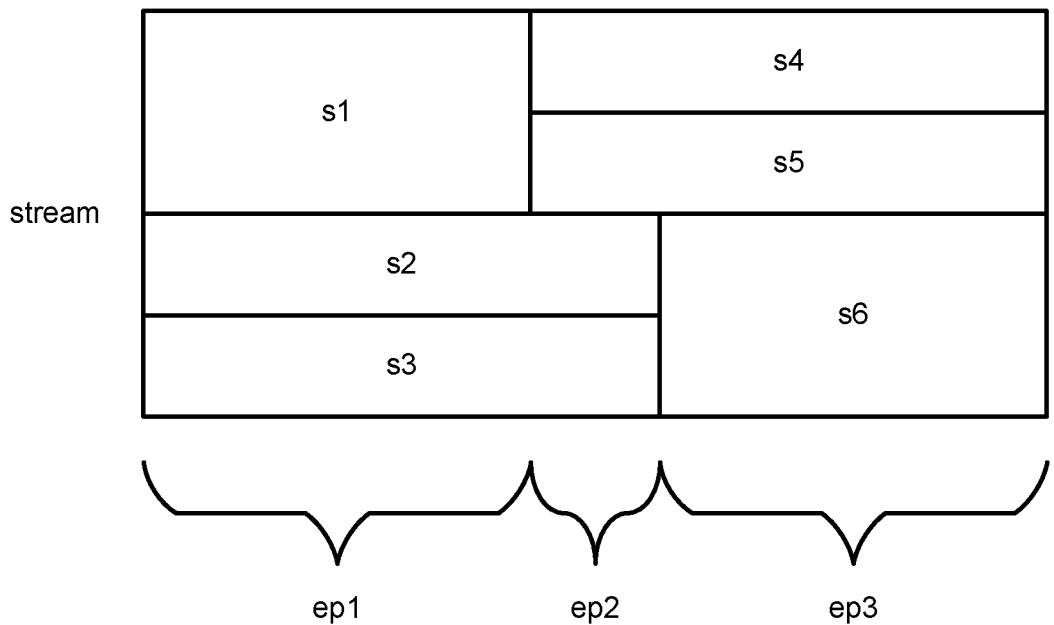
FIG. 8A is an example representation of segment scaling operations and epochs for segments with existing expiration times, in accordance with various aspects and implementations of the subject disclosure.

FIG. 8A shows a stream with two auto-scaling operations that split a stream into three epochs (ep1-ep3). During a scale up event, segment s1 is split into segments s4 and s5, and segment s1 gets sealed. During a scale down event, segments s2 and s3 get merged into segment s6, and segments s2 and s3 get sealed.

As expiration times are determined at the segment level, this can be problematic when the segment(s) of a stream are sealed and become inactive due to a scaling event, because stream-cuts are only created for active stream segments. For example, consider that segment s1 in FIG. 8A contains an event with expiration time in the far future, while segments s4 and s5 contain events with rather relatively short expiration periods. Then, if a stream-cut is created for the stream during epochs ep2 or ep3, the stream-cut would have a short expiration time for segments s4 and s5. This would truncate segments s4 and s5 too soon using the stream-cut, which would be incorrect behavior, as stream data needs to be deleted in chronological order, and there are still events in segment s1 with an expiration time far in the future. Therefore, the system needs to retain data expiration information as the stream scales up and down and old segments get sealed.

Stream scale up/down events are controlled by the controller, which instructs the segment store to create new segments and seal old segments. The controller creates and maintains the predecessor-successor relationships between segments. For instance, segment s1 from FIG. 8A is a predecessor segment of successor segments s4 and s5.

To retain the data expiration information, the controller has the successor segment(s) inherit the expiration times of their predecessor segment(s). During a scale-up operation, e.g., segment s1 is split into segment s4 and segment s5, the new segments inherit the final maximum expiration time of the predecessor segment as their initial maximum expiration times:

$s4$.initial_max_expiration_time=$s1$.final_max_expiration_time $s5$.initial_max_expiration_time=$s1$.final_max_expiration_time During scaling down, e.g., segments s2 and s3 are merged into segment s6, the successor segment inherits the maximal final maximum expiration time of the predecessor segments as its initial maximum expiration time:

$s6$.initial_max_expiration_time=max
   ($s2$.final_max_expiration_time,
   $s3$.final_max_expiration_time)

The inheriting of an expiration time by successor segment(s) makes the expiration task more straightforward to implement. If at least a part of some segment has expired, this means that all the predecessors of that segment have completely expired. The expiration task is free to delete such predecessors completely without additional precautions/pre-checks.

Figure 8B:
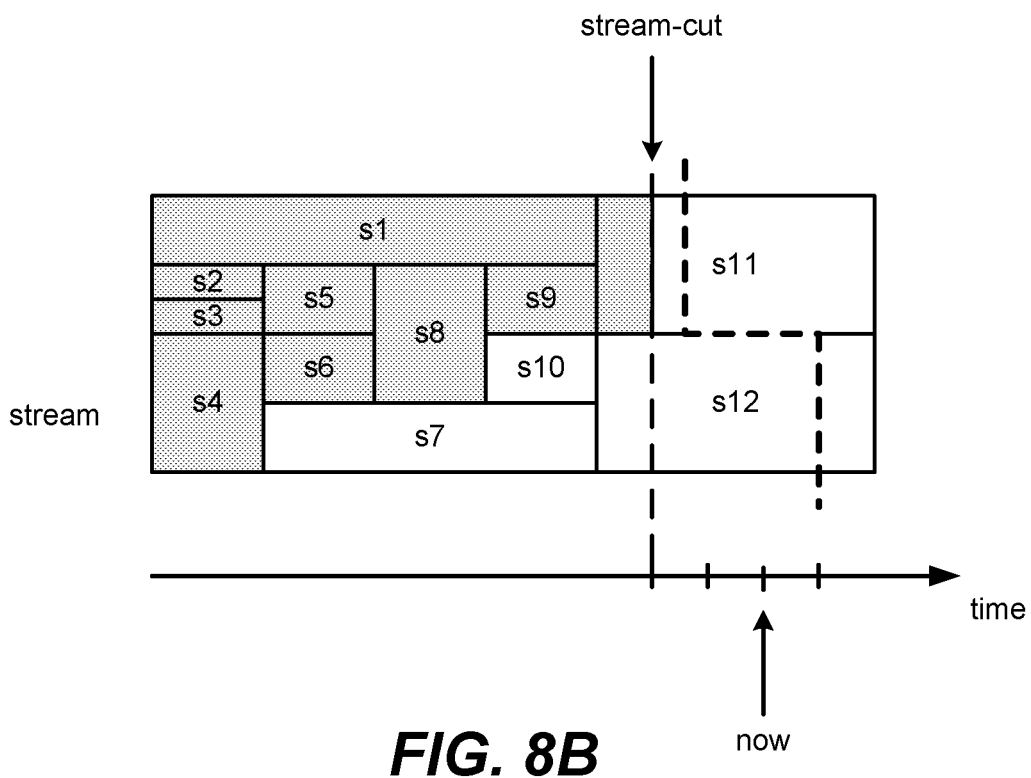
FIG. 8B is an example representation of segment scaling operations with respect to deleting predecessor segments when an active successor segment has some expired data prior to a stream cut, in accordance with various aspects and implementations of the subject disclosure.

In FIG. 8B, the shaded part of an active segment s11 (the topmost-rightmost one), has expired. That means that any predecessor segment(s) to s11, namely segments s1 and s9, have expired, as well as any predecessor segments of s1 and s9 (as well as their predecessor segment(s) and so on) have expired as well.

Because a stream's segments can be expired rather unevenly, the system checks to make sure there are no empty stream epochs. To this end, whenever the expiration task deletes a segment or its part, the expiration task looks for empty epochs and deletes them, if any. Note that this alternatively can be done in a separate task.

Figure 9:
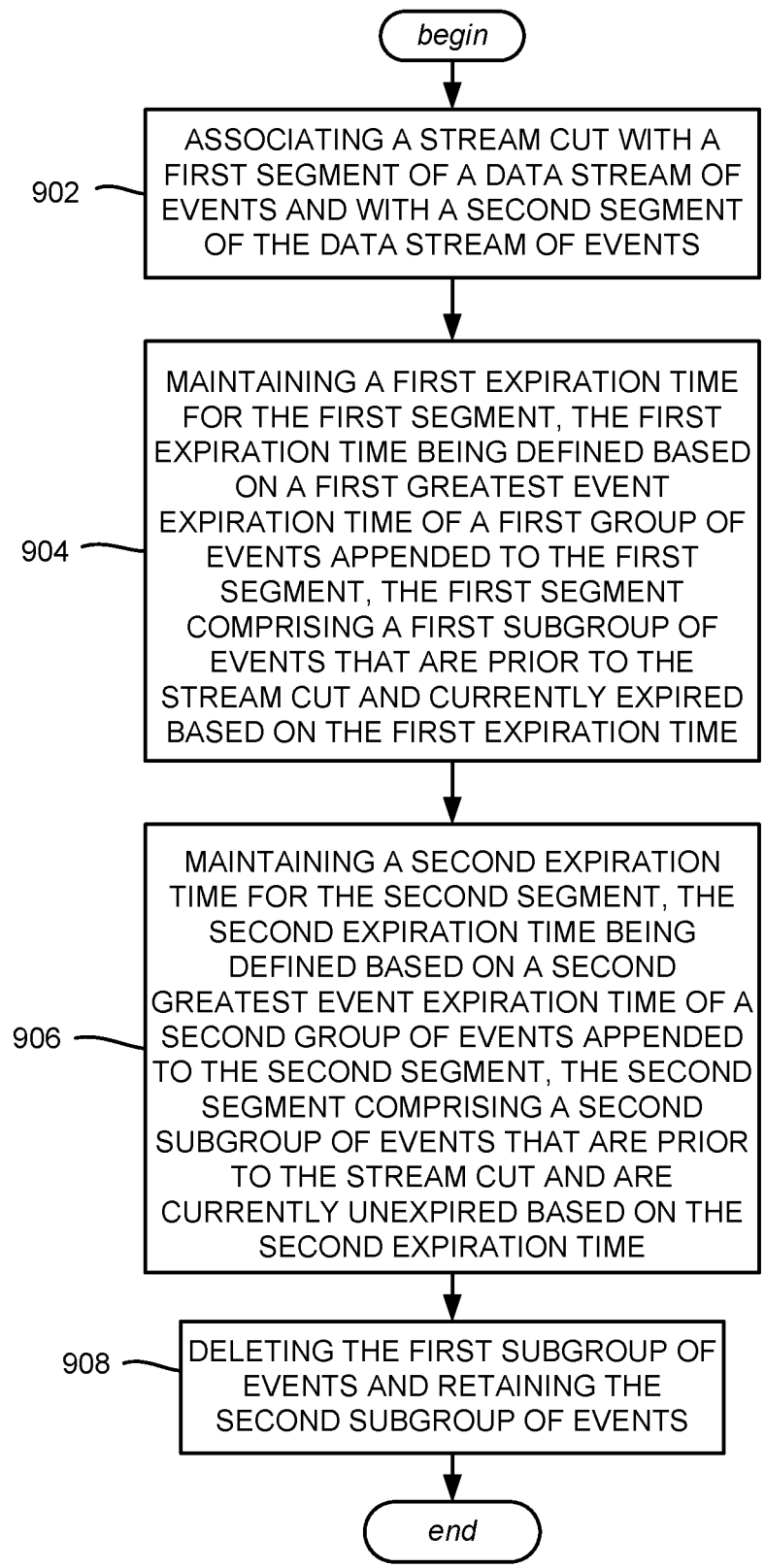
FIG. 9 is an example flow diagram showing example operations related to maintaining different expiration times with different segments of a data stream, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents associating a stream cut with a first segment of a data stream of events and with a second segment of the data stream of events. Operation 904 represents maintaining a first expiration time for the first segment, the first expiration time being defined based on a first greatest event expiration time of a first group of events appended to the first segment, the first segment comprising a first subgroup of events that are prior to the stream cut and currently expired based on the first expiration time. Operation 906 represents maintaining a second expiration time for the second segment, the second expiration time being defined based on a second greatest event expiration time of a second group of events appended to the second segment, the second segment comprising a second subgroup of events that are prior to the stream cut and are currently unexpired based on the second expiration time. Operation 908 represents deleting the first subgroup of events and retaining the second subgroup of events.

Further operations can comprise performing a scaling operation that splits the first segment into a third segment and a fourth segment, setting a third expiration time of the third segment to the first expiration time, and setting a fourth expiration time of the fourth segment to the first expiration time.

The stream cut can be a first stream cut, and further operations can comprise associating a second stream cut with the third segment and the fourth segment, determining that a third subgroup of events that are prior to the second stream cut are currently expired, deleting the third subgroup of events, and deleting the second segment.

Further operations can comprise deleting a predecessor segment of the second segment, the predecessor segment having been sealed in conjunction with the creation of the second segment in a scaling operation.

Further operations can comprise detecting an empty epoch having no associated segment, and deleting the empty epoch.

Further operations can comprise performing a scaling operation that merges the first segment and the second segment into a third segment, and setting a third expiration time of the third segment to the greater of the first expiration time or the second expiration time.

The stream cut can be a first stream cut, and further operations can comprise associating a second stream cut with the third segment, determining that a third subgroup of events that are prior to the second stream cut are currently expired, deleting the third subgroup of events, deleting the first segment and deleting the second segment.

Further operations can comprise deleting a predecessor segment of the first segment, the predecessor segment having been sealed in conjunction with the creation of the second segment in a scaling operation.

Further operations can comprise detecting an empty epoch having no associated segment, and deleting the empty epoch.

The first expiration time for the first segment can be maintained in first metadata of a first segment store instance associated with the first segment, and wherein the second expiration time for the second segment can be maintained in second metadata of a second segment store instance associated with the second segment.

Figure 10:
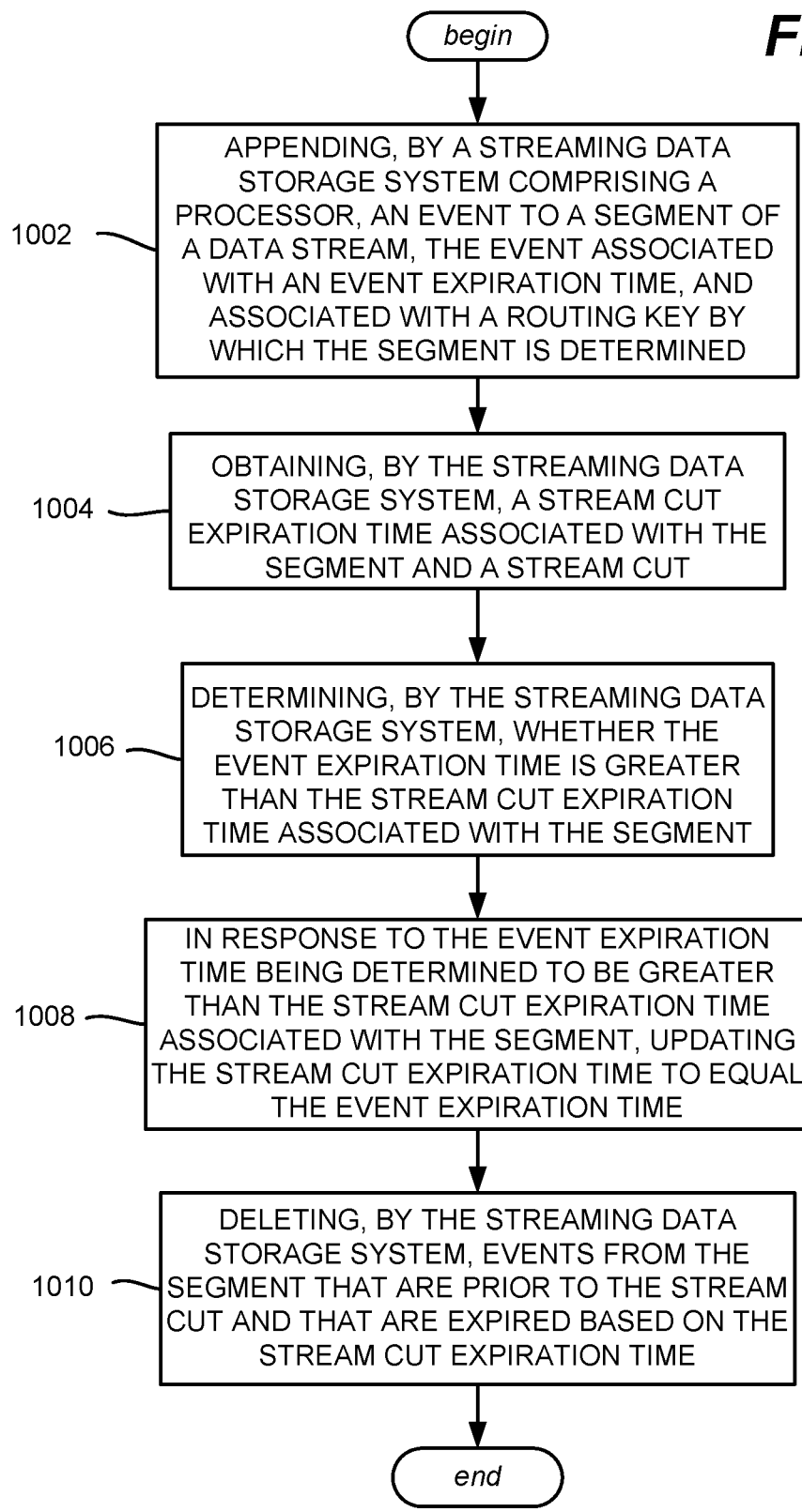
FIG. 10 is an example flow diagram showing example operations related to determining an expiration time for a segment when a new event is received, in accordance with various aspects and implementations of the subject disclosure.

One or more example aspects, such as corresponding to example operations of a method, are represented in FIG. 10. Operation 1002 represents appending, by a streaming data storage system comprising a processor, an event to a segment of a data stream, the event associated with an event expiration time, and associated with a routing key by which the segment is determined. Operation 1004 represents obtaining, by the streaming data storage system, a stream cut expiration time associated with the segment and a stream cut. Operation 1006 represents determining, by the streaming data storage system, whether the event expiration time is greater than the stream cut expiration time associated with the segment. Operation 1008 represents in response to the event expiration time being determined to be greater than the stream cut expiration time associated with the segment, updating the stream cut expiration time to equal the event expiration time. Operation 1010 represents deleting, by the streaming data storage system, events from the segment that are prior to the stream cut and that are expired based on the stream cut expiration time.

Appending of the event to the segment and the updating of the stream cut expiration time to equal the event to equal the event expiration time can occur in an atomic operation.

The event can be a first event, wherein the segment can be a first segment, the event expiration time can be a first expiration time, the routing key can be a first routing key, and further operations can comprise appending, by the streaming data storage system, a second event to a second segment of the data stream, the second event associated with a second event expiration time, and associated with a second routing key by which the second segment is selected, obtaining, by the streaming data storage system, a second stream cut expiration time associated with the second segment and the stream cut, determining, by the streaming data storage system, whether the second event expiration time is greater than the second stream cut expiration time associated with the second segment, in response to the second event expiration time being determined to be greater than the second stream cut expiration time associated with the second segment, updating, by the streaming data storage system, the second stream cut expiration time to equal the second event expiration time, and deleting, by the streaming data storage system, events from the second segment that are prior to the stream cut and that are expired based on the second stream cut expiration time.

The segment can be a predecessor segment, and further operations can comprise detecting, by the streaming data storage system, a scaling event that creates successor segments from the predecessor segment and seals the predecessor segment, and initializing, by the streaming data storage system, the stream cut expiration time of each successor segment to the expiration time associated with the predecessor segment.

The segment can be a first predecessor segment, and further operations can comprise detecting, by the streaming data storage system, a scaling event that merges the first predecessor segment and a second predecessor segment into a successor segment, in response to the scaling event, obtaining, by the streaming data storage system, a maximum expiration time of the first predecessor segment and the second predecessor segment, and initializing, by the streaming data storage system, the stream cut expiration time of the successor segment to the maximum expiration time.

Further operations can comprise detecting, by the streaming data storage system, an empty epoch having no associated segment, and deleting the empty epoch.

Figure 11:
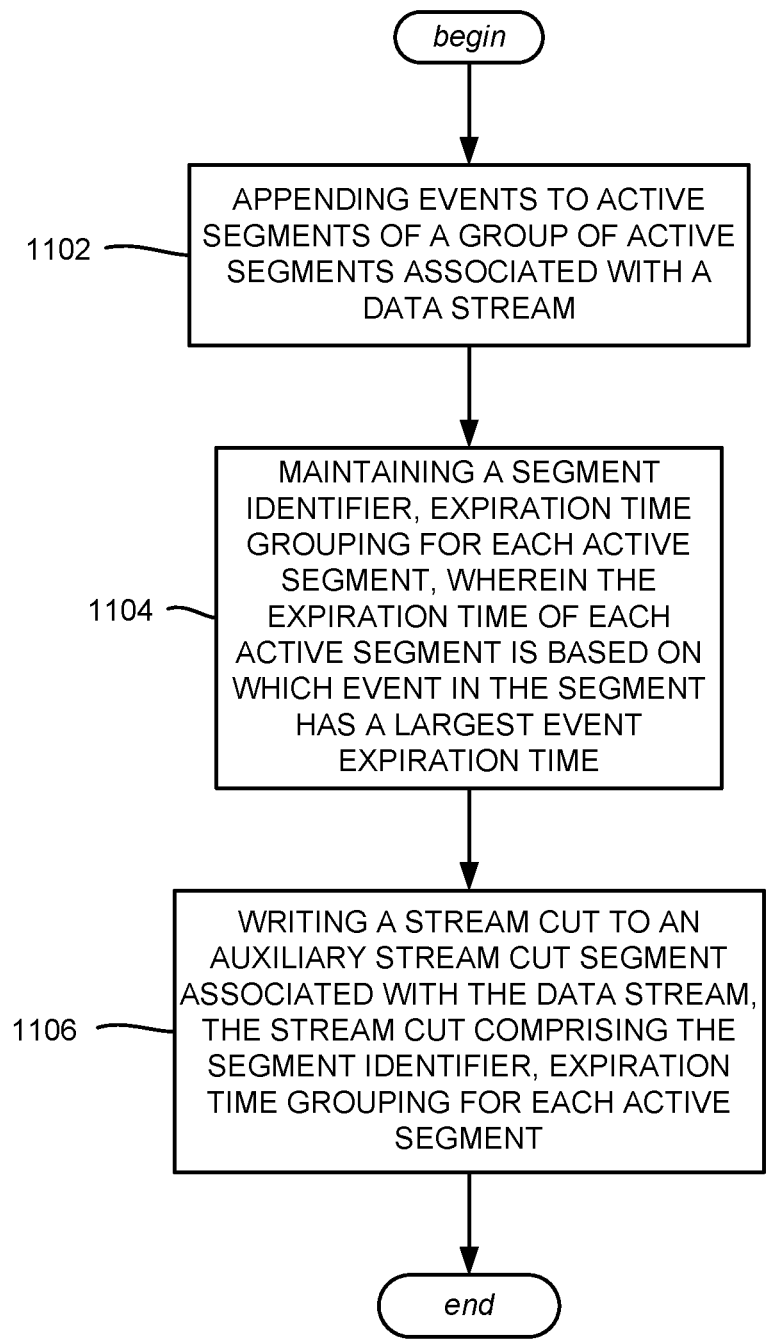
FIG. 11 is a flow diagram showing example operations related to writing a stream cut with per-segment expiration times, in accordance with various aspects and implementations of the subject disclosure.

FIG. 11 summarizes various example operations, e.g., corresponding to a machine-readable storage medium, comprising executable instructions that, when executed by a processor of a streaming data storage system, facilitate performance of operations. Operation 1102 represents appending events to active segments of a group of active segments associated with a data stream. Operation 1104 represents maintaining a segment identifier, expiration time grouping for each active segment, wherein the expiration time of each active segment is based on which event in the segment has a largest event expiration time. Operation 1106 represents writing a stream cut to an auxiliary stream cut segment associated with the data stream, the stream cut comprising the segment identifier, expiration time grouping for each active segment.

Further operations can comprise, for each segment of the group of active segments, accessing the stream cut to determine, based on the segment identifier, an expiration time grouping for the segment, whether the segment has expired events prior to the stream cut, and, in response to determining that the segment has expired events prior to the stream cut, deleting the expired events.

An active segment of the group can be a predecessor segment that is split into successor segments, and further operations can comprise, for each successor segment, initializing the segment identifier, expiration time grouping to the expiration time of the successor segment.

Two or more segments of the group can be predecessor segments that are merged into a successor segment, and further operations can comprise determining, based on the segment identifier, an expiration time grouping for each predecessor segment, a greatest expiration time among the two or more predecessor segments, and initializing a segment identifier, expiration time grouping of the successor segment to the greatest expiration time.

As can be seen, described herein is a technology that facilitates more flexible, fine-grained data expiration based on event-level expiration times in streaming data storage platforms/systems. The technology may be used to increase capacity use efficiency in streaming data storage platforms/systems.

Figure 12:
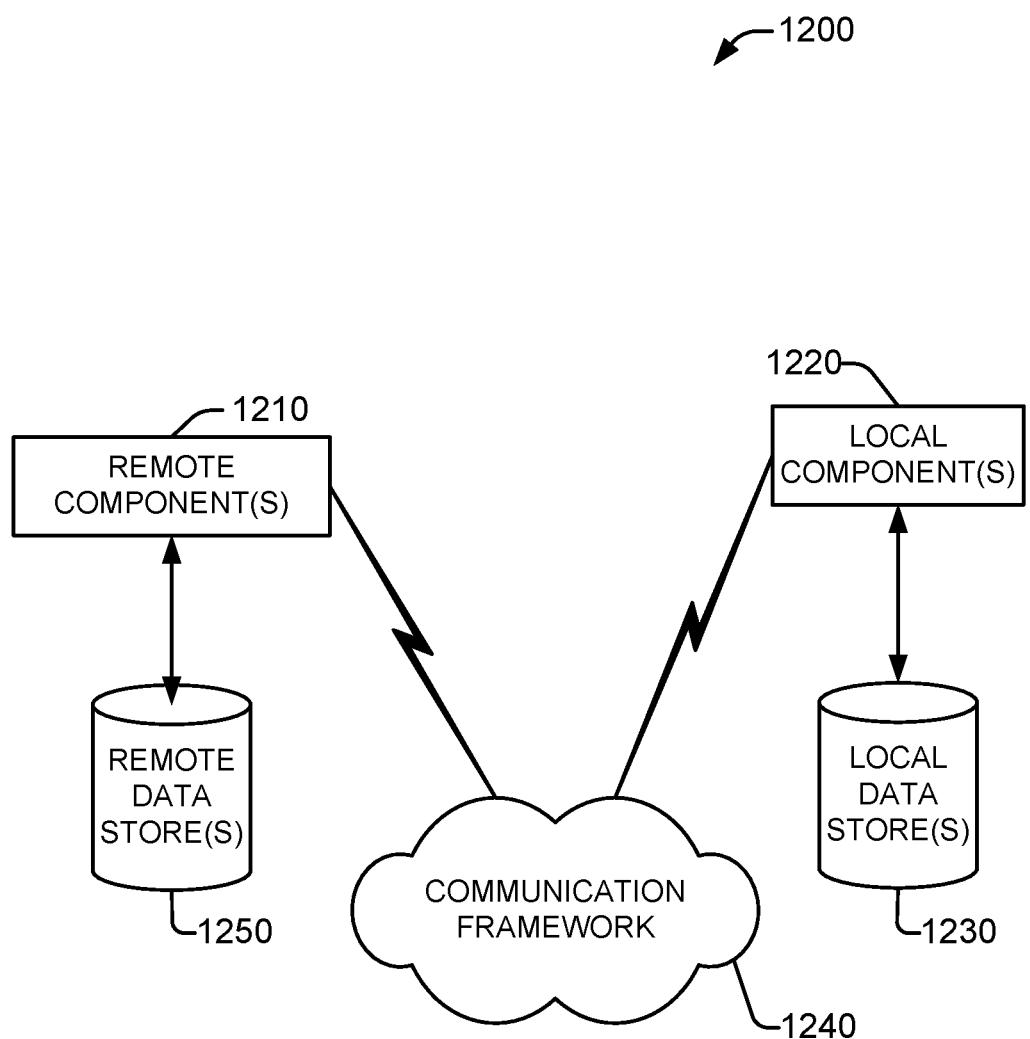
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
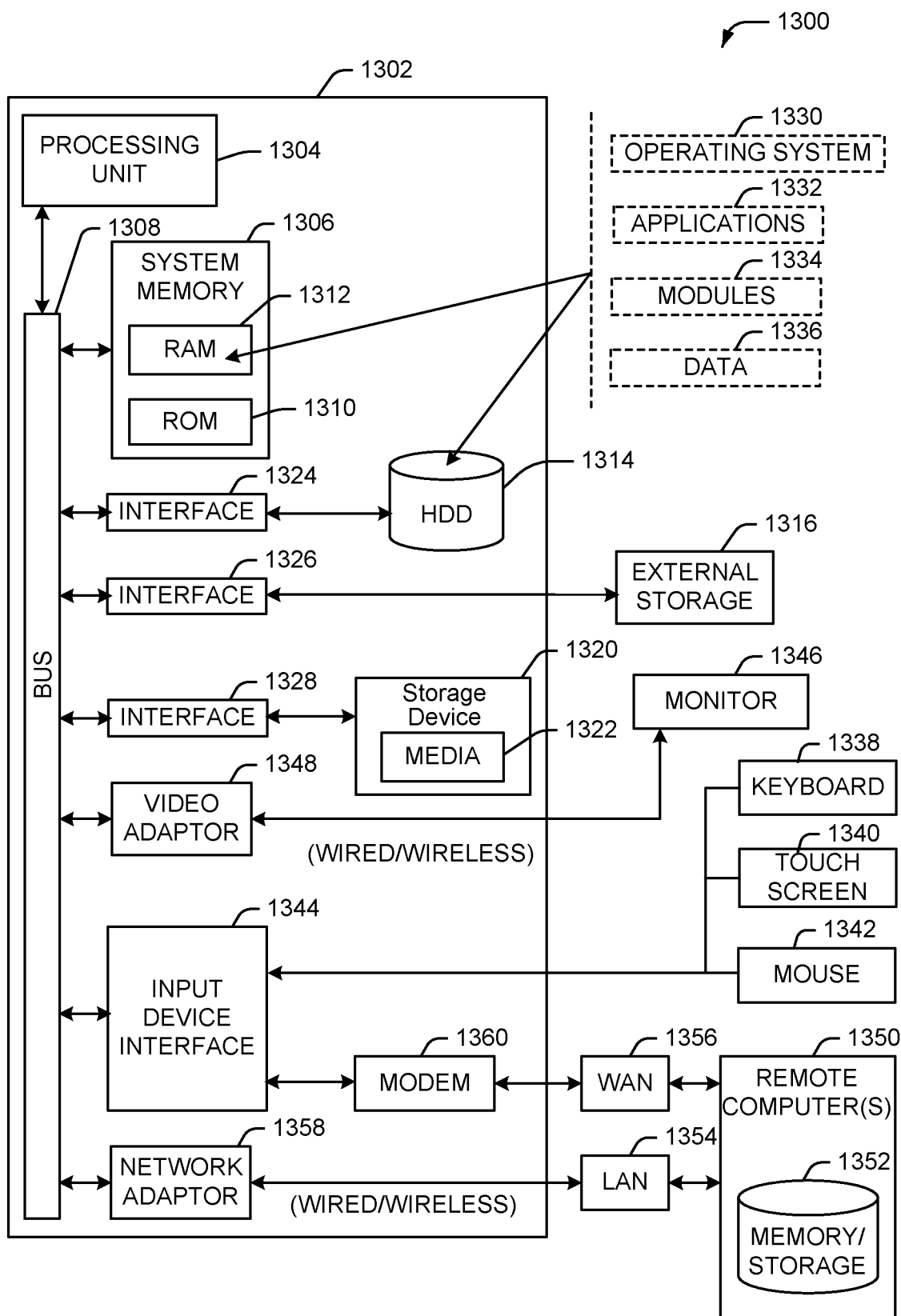
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
associating a stream cut with a first segment of a data stream of events and with a second segment of the data stream of events;
maintaining a first expiration time for the first segment, the first expiration time being defined based on a first greatest event expiration time of a first group of events appended to the first segment, the first segment comprising a first subgroup of events that are prior to the stream cut and currently expired based on the first expiration time;
maintaining a second expiration time for the second segment, the second expiration time being defined based on a second greatest event expiration time of a second group of events appended to the second segment, the second segment comprising a second subgroup of events that are prior to the stream cut and are currently unexpired based on the second expiration time; and
deleting the first subgroup of events and retaining the second subgroup of events.

2. The system of claim 1, wherein the operations further comprise performing a scaling operation that splits the first segment into a third segment and a fourth segment, setting a third expiration time of the third segment to the first expiration time, and setting a fourth expiration time of the fourth segment to the first expiration time.

3. The system of claim 1, wherein the stream cut is a first stream cut, and wherein the operations further comprise associating a second stream cut with the third segment and the fourth segment, determining that a third subgroup of events that are prior to the second stream cut are currently expired, deleting the third subgroup of events, and deleting the second segment.

4. The system of claim 3, wherein the operations further comprise deleting a predecessor segment of the second segment, the predecessor segment having been sealed in conjunction with the creation of the second segment in a scaling operation.

5. The system of claim 3, wherein the operations further comprise detecting an empty epoch having no associated segment, and deleting the empty epoch.

6. The system of claim 1, wherein the operations further comprise performing a scaling operation that merges the first segment and the second segment into a third segment, and setting a third expiration time of the third segment to the greater of the first expiration time or the second expiration time.

7. The system of claim 6, wherein the stream cut is a first stream cut, and wherein the operations further comprise associating a second stream cut with the third segment, determining that a third subgroup of events that are prior to the second stream cut are currently expired, deleting the third subgroup of events, deleting the first segment and deleting the second segment.

8. The system of claim 6, wherein the operations further comprise deleting a predecessor segment of the first segment, the predecessor segment having been sealed in conjunction with the creation of the second segment in a scaling operation.

9. The system of claim 6, wherein the operations further comprise detecting an empty epoch having no associated segment, and deleting the empty epoch.

10. The system of claim 1, wherein the first expiration time for the first segment is maintained in first metadata of a first segment store instance associated with the first segment, and wherein the second expiration time for the second segment is maintained in second metadata of a second segment store instance associated with the second segment.

11. A method, comprising:
appending, by a streaming data storage system comprising a processor, an event to a segment of a data stream, the event associated with an event expiration time, and associated with a routing key by which the segment is determined;
obtaining, by the streaming data storage system, a stream cut expiration time associated with the segment and a stream cut;
determining, by the streaming data storage system, whether the event expiration time is greater than the stream cut expiration time associated with the segment;
in response to the event expiration time being determined to be greater than the stream cut expiration time associated with the segment, updating the stream cut expiration time to equal the event expiration time; and
deleting, by the streaming data storage system, events from the segment that are prior to the stream cut and that are expired based on the stream cut expiration time.

12. The method of claim 11, wherein the appending of the event to the segment and the updating of the stream cut expiration time to equal the event to equal the event expiration time occur in an atomic operation.

13. The method of claim 11, wherein the event is a first event, wherein the segment is a first segment, wherein the event expiration time is a first expiration time, wherein the routing key is a first routing key, and further comprising appending, by the streaming data storage system, a second event to a second segment of the data stream, the second event associated with a second event expiration time, and associated with a second routing key by which the second segment is selected, obtaining, by the streaming data storage system, a second stream cut expiration time associated with the second segment and the stream cut, determining, by the streaming data storage system, whether the second event expiration time is greater than the second stream cut expiration time associated with the second segment, in response to the second event expiration time being determined to be greater than the second stream cut expiration time associated with the second segment, updating, by the streaming data storage system, the second stream cut expiration time to equal the second event expiration time, and deleting, by the streaming data storage system, events from the second segment that are prior to the stream cut and that are expired based on the second stream cut expiration time.

14. The method of claim 11, wherein the segment is a predecessor segment, and further comprising detecting, by the streaming data storage system, a scaling event that creates successor segments from the predecessor segment and seals the predecessor segment, and initializing, by the streaming data storage system, the stream cut expiration time of each successor segment to the expiration time associated with the predecessor segment.

15. The method of claim 11, wherein the segment is a first predecessor segment, and further comprising detecting, by the streaming data storage system, a scaling event that merges the first predecessor segment and a second predecessor segment into a successor segment, in response to the scaling event, obtaining, by the streaming data storage system, a maximum expiration time of the first predecessor segment and the second predecessor segment, and initializing, by the streaming data storage system, the stream cut expiration time of the successor segment to the maximum expiration time.

16. The method of claim 11, further comprising detecting, by the streaming data storage system, an empty epoch having no associated segment, and deleting the empty epoch.

17. A non-transitory machine-readable medium, comprising executable instructions that, when executed by a processor of a streaming data storage system, facilitate performance of operations, the operations comprising:
appending events to active segments of a group of active segments associated with a data stream;
maintaining a segment identifier, expiration time grouping for each active segment, wherein the expiration time of each active segment is based on which event in the segment has a largest event expiration time; and
writing a stream cut to an auxiliary stream cut segment associated with the data stream, the stream cut comprising the segment identifier, expiration time grouping for each active segment.

18. The non-transitory machine-readable medium of claim 17, wherein the operations further comprise, for each segment of the group of active segments, accessing the stream cut to determine, based on the segment identifier, expiration time grouping for the segment, whether the segment has expired events prior to the stream cut, and, in response to determining that the segment has expired events prior to the stream cut, deleting the expired events.

19. The non-transitory machine-readable medium of claim 17, wherein an active segment of the group is a predecessor segment that is split into successor segments, and wherein the operations further comprise, for each successor segment, initializing the segment identifier, expiration time grouping to the expiration time of the successor segment.

20. The non-transitory machine-readable medium of claim 17, wherein two or more segments of the group are predecessor segments that are merged into a successor segment, and wherein the operations further comprise, determining, based on the segment identifier, expiration time grouping for each predecessor segment, a greatest expiration time among the two or more predecessor segments, and initializing a segment identifier, expiration time grouping of the successor segment to the greatest expiration time.

\* \* \* \* \*